US011785651B2

(12) United States Patent
Matsumoto et al.

(10) Patent No.: US 11,785,651 B2
(45) Date of Patent: Oct. 10, 2023

(54) DEVICE MANAGEMENT SYSTEM

(71) Applicant: NTT DOCOMO, INC., Chiyoda-ku (JP)

(72) Inventors: Nozomi Matsumoto, Chiyoda-ku (JP); Takashi Okada, Chiyoda-ku (JP); Kazuoki Ichikawa, Chiyoda-ku (JP); Tatsuya Nishizaki, Chiyoda-ku (JP)

(73) Assignee: NTT DOCOMO, INC., Chiyoda-ku (JP)

( * ) Notice: Subject to any disclaimer, the term of this patent is extended or adjusted under 35 U.S.C. 154(b) by 211 days.

(21) Appl. No.: 17/420,828

(22) PCT Filed: Oct. 1, 2019

(86) PCT No.: PCT/JP2019/038815
§ 371 (c)(1),
(2) Date: Jul. 6, 2021

(87) PCT Pub. No.: WO2020/174736
PCT Pub. Date: Sep. 3, 2020

(65) Prior Publication Data
US 2022/0095392 A1    Mar. 24, 2022

(30) Foreign Application Priority Data
Feb. 25, 2019   (JP) .................. 2019-031798

(51) Int. Cl.
*H04W 64/00*   (2009.01)
*H04W 76/10*   (2018.01)
*H04W 4/02*    (2018.01)

(52) U.S. Cl.
CPC .......... *H04W 76/10* (2018.02); *H04W 4/023* (2013.01)

(58) Field of Classification Search
CPC ..... H04W 64/00; H04W 4/021; H04W 76/10; H04W 24/02; H04W 4/023; G06F 13/00; H04M 11/00; H04M 1/00; Y02D 30/70
See application file for complete search history.

(56) References Cited

U.S. PATENT DOCUMENTS 9,467,935 B2 * 10/2016 Yoshida ................ H04W 48/18
10,164,844 B2 * 12/2018 Tanaka ................ H04L 12/6418
(Continued)

FOREIGN PATENT DOCUMENTS

JP   2003-67309 A   3/2003
JP   2018-67955 A   4/2018

OTHER PUBLICATIONS

Office Action dated May 10, 2022, in corresponding Japanese Patent Application No. 2021-501545 (with English Translation), 12 pages.
(Continued)

*Primary Examiner* — Khawar Iqbal
(74) *Attorney, Agent, or Firm* — Oblon, McClelland, Maier & Neustadt, L.L.P.

(57) ABSTRACT

A device management system according to one embodiment includes: an acquisition unit configured to obtain a proximity notification that represents a situation in which a portable connection source device is in proximity to one geographical range; and a list generating unit configured to transmit a candidate list representing candidate connection destination devices to the connection source device in response to the proximity notification. The list generating unit is further configured to: refer to a database storing a connection history that represents past connections between the connection source device and one or more past connection destination devices; select at least one of one or more devices corresponding to the geographical range as the candidate connection destination devices based on the connection history; and display the candidate list on the con-
(Continued)

nection source device by transmitting the candidate list representing at least one candidate connection destination device to the connection source device.

3 Claims, 6 Drawing Sheets

(56) References Cited

U.S. PATENT DOCUMENTS

| | | | |
|---|---|---|---|
| 10,386,890 B2 * | 8/2019 | Myung | G06F 1/1692 |
| 10,869,347 B2 * | 12/2020 | Jiang | H04W 76/11 |
| 10,945,197 B2 * | 3/2021 | Choi | H04W 4/24 |
| 10,977,688 B2 * | 4/2021 | Ozaki | G06Q 30/0255 |
| 2014/0045516 A1 * | 2/2014 | Turgman | H04W 4/02 |
| | | | 455/456.1 |
| 2014/0192737 A1 * | 7/2014 | Belghoul | H04W 4/021 |
| | | | 370/328 |
| 2014/0240768 A1 * | 8/2014 | Kimura | G06F 3/1292 |
| | | | 358/1.15 |
| 2016/0157284 A1 * | 6/2016 | Kim | H04W 76/10 |
| | | | 370/329 |
| 2019/0334923 A1 * | 10/2019 | Most | H04L 63/1425 |
| 2021/0258418 A1 * | 8/2021 | Ledvina | H04L 69/18 |
| 2022/0095393 A1 * | 3/2022 | Matsumoto | H04W 4/02 |

OTHER PUBLICATIONS

International Search Report dated Dec. 17, 2019 in PCT/JP2019/038815 filed on Oct. 1, 2019, 1 page.
International Preliminary Report on Patentability dated Sep. 2, 2021 in PCT/JP2019/038815 (submitting English translation only), 1 page.

* cited by examiner

*Fig.3*

| PAST CONNECTION INFORMATION | | | | |
|---|---|---|---|---|
| USE ID | TIME FRAME | PLACE | FACILITY | CONNECTION | ... |
| ... | ... | ... | ... | ... | ... |
| 110101 | 8-9 AM | X DISTRICT | STATION | CONNECTED | |
| 110230 | 9-10 AM | X DISTRICT | SHOP | CONNECTED | |
| 110340 | 10-11 AM | Z DISTRICT | SHOP | NONE | |
| ... | ... | ... | ... | ... | ... |
| 110295 | 10-11 AM | Y DISTRICT | SCHOOL | CONNECTED | |
| 110590 | 11AM-12PM | W DISTRICT | COMPANY | CONNECTED | |
| 111004 | 12-1PM | W DISTRICT | STATION | CONNECTED | |
| ... | ... | ... | ... | ... | ... |

50

| CONNECTION SOURCE DEVICE INFORMATION | | | | | PAST CONNECTION DESTINATION DEVICE INFORMATION | | | | | |
|---|---|---|---|---|---|---|---|---|---|---|
| DEVICE ID | BATTERY | APPLICATION | DATA | ... | DEVICE ID | MANUFACTURER | TYPE | USE FORM | CHARGE | ... |
| ... | ... | ... | ... | ... | ... | ... | ... | ... | ... | ... |
| 40034 | 80% | NAVIGATION | ROUTE | ... | 10001 | MANUFACTURER P | MONITOR | PUBLIC | 100 YEN | ... |
| 40034 | 60% | MAP | MAP | ... | 20005 | MANUFACTURER S | HMD | PUBLIC | FREE | ... |
| 40034 | 30% | GAME | — | ... | 15001 | MANUFACTURER V | HMD | PUBLIC | FREE | ... |
| ... | ... | ... | ... | ... | ... | ... | ... | ... | ... | ... |
| 23900 | 50% | PRESENTATION | DOCUMENT | ... | 35001 | MANUFACTURER N | MONITOR | PERSONAL | FREE | ... |
| 23900 | 75% | MUSIC | MUSIC | ... | 55001 | MANUFACTURER S | SPEAKER | ORGANIZATION | 30 YEN | ... |
| 23900 | 20% | NAVIGATION | ROUTE | ... | 60002 | MANUFACTURER A | WATCH | PUBLIC | 100 YEN | ... |

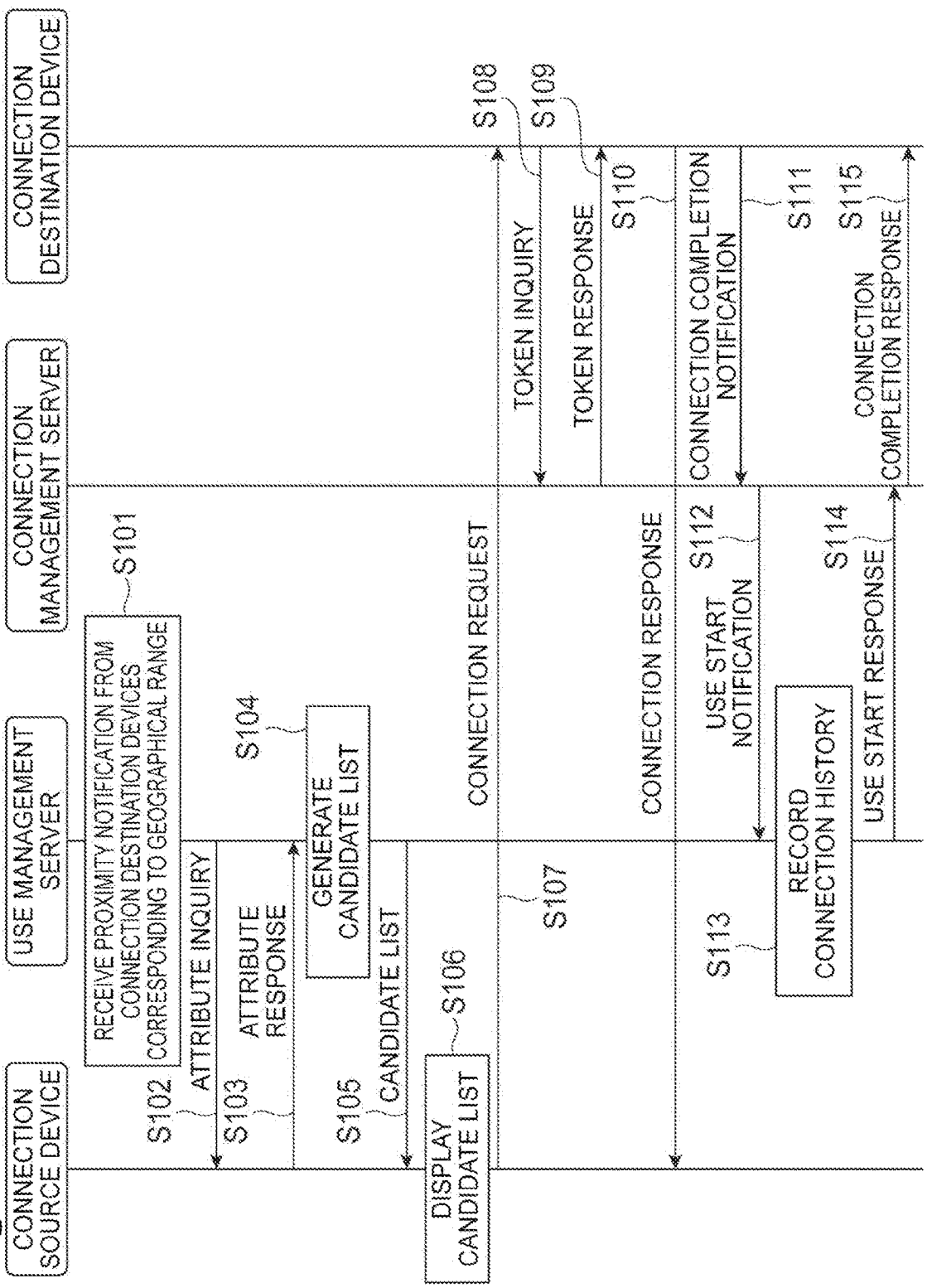

DEVICE MANAGEMENT SYSTEM

TECHNICAL FIELD

One aspect of the present disclosure relates to a device management system.

BACKGROUND ART

Technologies for managing connections between devices through a radio communication network are known. For example, Patent Literature 1 describes a communication device having a Wi-Fi Direct function. This communication device includes an identifying means that identifies a service to be used with a Wi-Fi Direct function by a user among a plurality of services including at least a print service, a display means that displays a candidate list used for the user to select a connection destination providing the service identified by the identifying means, and a processing means that executes a connection process between a device selected from the candidate list by the user and the communication device.

CITATION LIST

Patent Literature

[Patent Literature 1] JP 2018-67955 A

SUMMARY OF INVENTION

Technical Problem

When a candidate list of communication destination devices includes devices that are unnecessary for a user (for example, a device that is not desired to be connected by a user), there is a possibility of impairing the convenience of network connections between devices. Thus, it is desirable to improve the convenience of network connections between devices.

Solution to Problem

A device management system according to one aspect of the present disclosure includes: an acquisition unit configured to obtain a proximity notification that indicates a situation in which a portable connection source device has come into proximity to one geographical range; and a list generating unit configured to transmit a candidate list representing candidate connection destination devices to be connected to the connection source device through a radio communication network to the connection source device in response to the proximity notification. The list generating unit is further configured to: refer to a database storing a connection history that represents past connections between the connection source device and one or more past connection destination devices; select at least one of one or more devices corresponding to the geographical range as the candidate connection destination devices based on the connection history; and display the candidate list on the connection source device by transmitting the candidate list representing at least one candidate connection destination device to the connection source device.

In such an aspect, connection destination devices that become candidates to be connected with the connection source device through a network are selected based on past records representing that the connection source device was connected to other devices (past connection destination devices). By referring to the past connection recordings of the connection source device, connection destination devices having high probabilities of being selected by the user can be included in the candidate list, and thus, it is expected to improve the convenience of network connections between devices.

Advantageous Effects of Invention

According to one aspect of the present disclosure, the convenience of network connections between devices can be improved.

BRIEF DESCRIPTION OF DRAWINGS

FIG. 3 is a diagram illustrating one example of a connection history.

FIG. 4 is a sequence diagram illustrating one example of an operation of a device management system according to an embodiment.

DESCRIPTION OF EMBODIMENTS

Figure 1:
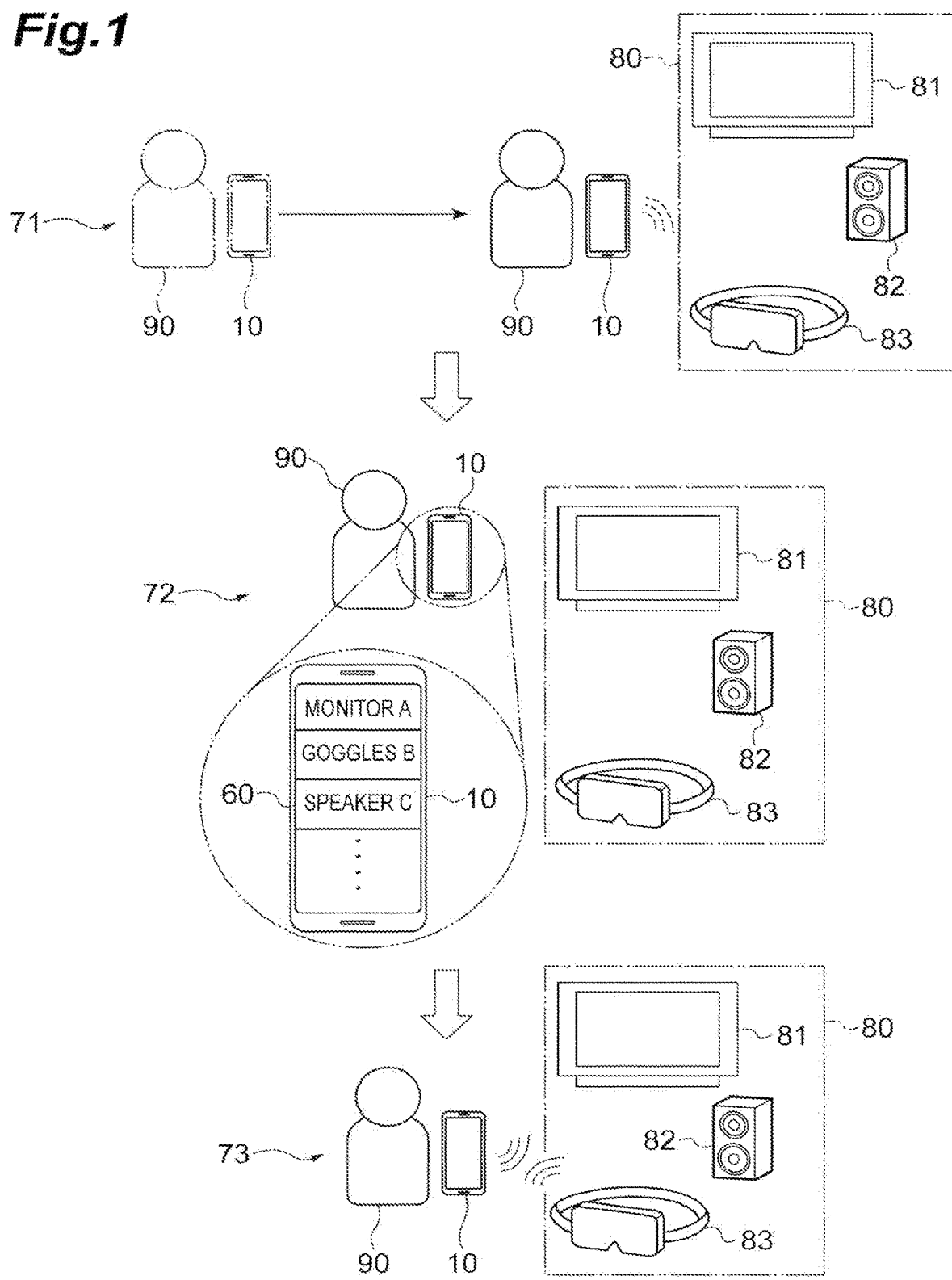
FIG. 1 is a diagram illustrating one example of management of a connection using a device management system according to an embodiment.

Hereinafter, an embodiment of the present disclosure will be described in detail with reference to the attached drawings. In description of the drawings, the same reference signs will be assigned to the same or equivalent elements, and duplicate description thereof will be omitted.

A device management system according to this embodiment is a computer system that manages connections between devices through a radio communication network. More specifically, the radio communication network represents a short-range radio communication network of which a communication distance has an order of up to several hundred meters. Examples of a radio communication network include a wireless LAN such as Wi-Fi (registered trademark) and Bluetooth (registered trademark), but the type of radio communication network that connects devices is not limited thereto. Here, a device is a computer having a radio communication function. The type of device is not particularly limited. For example, the device may be a mobile terminal such as a mobile phone, a high-performance mobile phone (smartphone), a tablet terminal, a wearable terminal (for example, a smart watch, a head mount display (HMD), or the like), or a non-contact IC card. Alternatively, the device may be an arbitrary electrical product or electronic product of a portable type or a stationary type such as a monitor, a camera, a speaker, a robot, an air conditioner, or a cleaner.

The device management system manages a connection between a connection source device and a connection destination device through a radio communication network. The connection source device represents a portable-type device held by a user. The connection destination device represents a device that can be connected to the connection source device through a radio communication network. The connection destination device may be either a portable type or a stationary type. When seen from the connection source device, the connection destination device can be regarded as a device that functions as a peripheral device with respect to the connection source device. For example, the connection source device may be a mobile terminal having high portability such as a smartphone, a smart watch, or a non-contact IC card. On the other hand, the connection destination device may be a device having portability lower than that of the connection source device, or a high-priced device, such as a head mount display (HMD), a tablet terminal, a large screen monitor (signage), a camera, or a speaker. As described above, the connection source device and the connection destination device are not limited to such examples.

Ownership and a management type of each of the connection source device and the connection destination device are not particularly limited. For example, the connection source device may be a device that is owned or temporarily used by a user. On the other hand, the connection destination device may be used by many unspecified people or may be used by persons within a group satisfying specific conditions. The group satisfying specific conditions is not particularly limited and, for example, may be persons subscribing to a specific service, or persons belonging to a specific organization (a local government, a company, or the like). The connection destination device may be used by a plurality of users at the same time. In this way, the connection destination device may be a shared device or a public device. Alternatively, the connection destination device may be a device that is owned or temporarily used by a user.

FIG. 1 is a diagram illustrating one example of management of connections using a device management system 1 according to an embodiment. A situation 71 represents that a user 90 carrying a connection source device 10 comes close to a geographical range 80 in which at least a signage (monitor) 81, a speaker 82, and an HMD (goggles) 83 are present. A smartphone is illustrated as the connection source device 10 in FIG. 1. The signage 81, the speaker 82, and the HMD 83 are examples of candidates for a connection destination device 20. When this situation 71 is detected, the device management system 1, as illustrated in a situation 72, selects at least one of a plurality of devices corresponding to the geographical range 80 as a candidate for a connection destination device 20 and displays a candidate list 60 representing selected candidates on the connection source device 10. In the example illustrated in FIG. 1, the candidate list 60 includes the signage 81, the speaker 82, and the HMD 83. As illustrated in a situation 73, when the user 90 selects one connection destination device 20 from the candidate list 60, the connection source device 10 establishes a connection with the selected connection destination device 20. In the example illustrated in FIG. 1, the HMD 83 is selected and connected to the connection source device 10.

The geographical range represents a finite range in a real three-dimensional space (in other words, a real world). The size and the boundary of the geographical range may be arbitrarily designed. The boundary of the geographical range may be virtually defined, may be defined using a physical boundary, or may be defined using both virtual and physical boundaries. The geographical range may be expressed in a three-dimensional space or a two-dimensional space. A "device corresponding to a geographical range" represents a device that is located within the geographical range or in the vicinity thereof.

If a mechanism is employed that unconditionally presents to the user 90 all the devices corresponding to the geographical range 80, there is a possibility that an unnecessary device for the user 90 is included in the candidate list. For example, there is a possibility that a device with which a connection is not desired by the user 90 is displayed at high ranking of the candidate list, and the user 90 may need to scroll the candidate list toward lower ranking. In order to avoid or alleviate such a situation and improve convenience of a network connection between devices by, the device management system 1 refers to records of past connections of the connection source device 10 and then presents the candidate list to the user 90.

When the connection source device 10 is connected to the connection destination device 20, the user 90 can enjoy various services by temporally occupying or sharing the connection destination device 20. For example, the user 90 can have various experiences such as device sharing, and cooperation with a public device. In such services, the user 90 can connect the connection source device 10 to the connection destination device 20 temporarily and link an application program or data that is normally used on the connection source device 10 with the connection destination device 20. For example, the user 90 can link a smartphone (a connection source device 10) with a seat monitor (a connection destination device 20) of an air plane, a bus, or the like, and display a content of a video service under contract with the user 90 on the monitor. Alternatively, the user 90 can link a smart watch (a connection source device 10) with a connection destination device 20 such as a ticket gate in a station or a signage of a bus station, and check route information displayed on the connection destination device 20.

In such scenes, the user 90 may not be able to use again a connection destination device 20 that is the same as or similar to a device that has been used before. In addition, the user 90 may not desire to use a connection destination device 20 of the same type at other places. A connection destination device 20 that becomes a candidate may vary in accordance with attributes of the connection source device 10 or attributes of the connection destination device 20. Here, in the present disclosure, "attributes of a device" represents data items characterizing the device and, for example, represents features, a performance, a configuration, a function, or a state of the device. For example, the validity of a connection may vary in accordance with at least one of the battery capacity of the connection source device 10, an application program in operation in the connection source device 10, and data processed by that application program. Alternatively, the validity of a connection may vary in accordance with at least one of a manufacturer, a type, a use form, and a usage charge of the connection destination device 20. A connection destination device 20 that becomes a candidate may also vary in accordance with attributes of a connection between the connection source device 10 and the connection destination device 20. The attributes of a connection represent items characterizing the connection. For example, the validity of a connection may vary in accordance with at least one of a connection time period, a connection place, and a type of facility at which the connection is performed.

In order to improve the convenience of a network connection between devices, the device management system 1 refers to a connection history that is data representing past connections between the connection source device 10 and one or more past connection destination devices. The device management system 1 selects at least one of one or more devices corresponding to the geographical range as a candidate for a connection destination device based on the connection history. Then, by transmitting a candidate list representing at least one candidate for a connection destination device to the connection source device 10, the device management system 1 displays the candidate list on the connection source device 10. In the present disclosure, a connection destination device, which is represented in the candidate list, having a possibility of being connected to the connection source device 10 will be also referred to as a "candidate connection destination device". A connection destination device recorded in a connection history used for generating a candidate list will be also referred to as a "past connection destination device" such that it can be differentiated from a connection destination device corresponding to the geographical range and a candidate connection destination device. In the present disclosure, the connection destination device 20 corresponds to a connection destination device corresponding to the geographical range, a candidate connection destination device, or a connection destination device that is actually connected to the connection source device 10.

Figure 2:
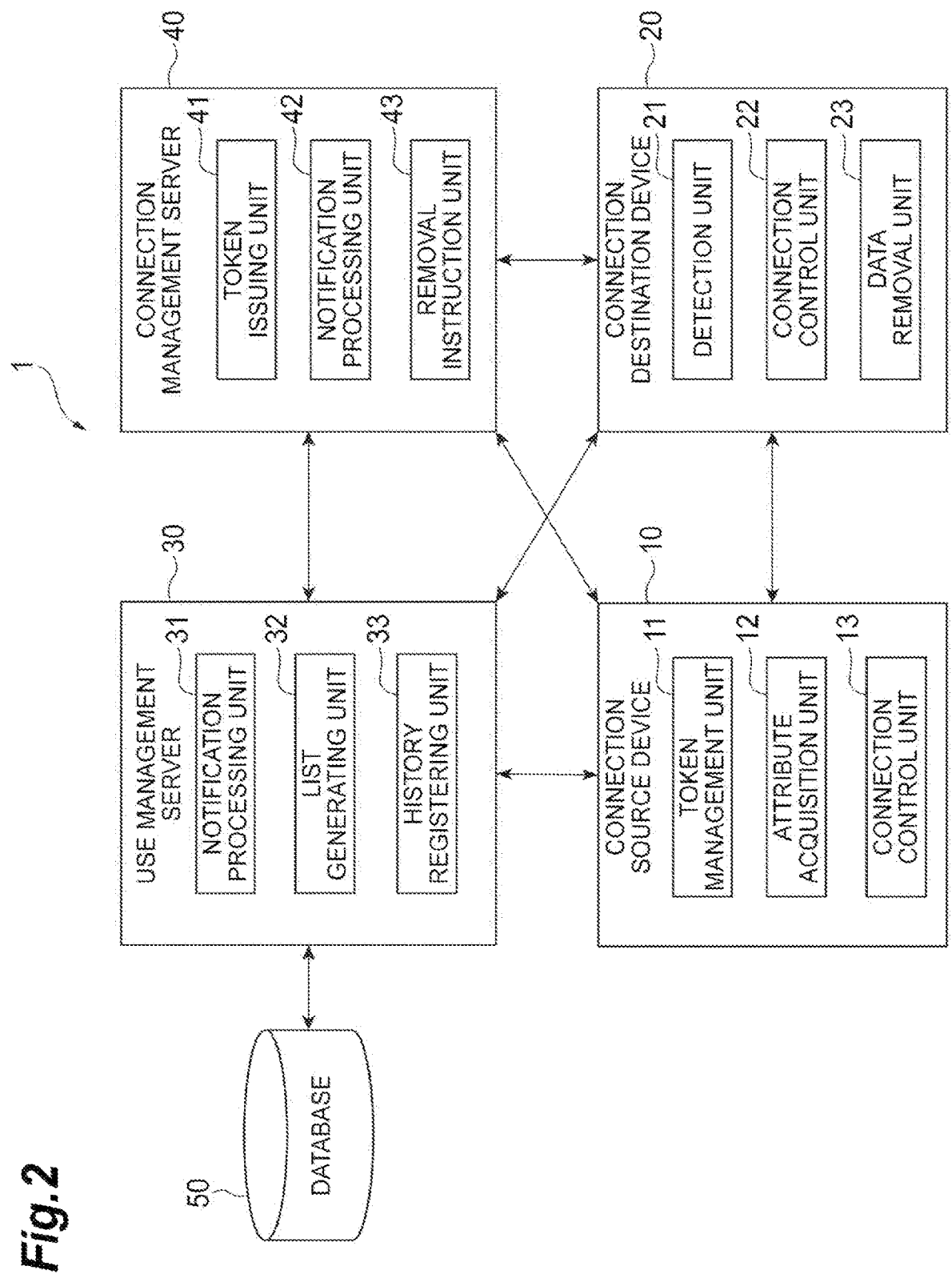
FIG. 2 is a diagram illustrating one example of the functional configuration of a device management system according to an embodiment.

FIG. 2 is a diagram illustrating one example of the functional configuration of the device management system 1. In order to manage a connection between a connection source device 10 and a connection destination device 20, the device management system 1 according to this embodiment includes a use management server 30 and a connection management server 40, and these two servers operate in association with each other for the connection management. The use management server 30 is a computer that provides a candidate list to the connection source device 10. The use management server 30 can access a database 50 that stores a connection history. The connection management server 40 is a computer that executes a process relating to a connection between the connection source device 10 and the connection destination device 20.

The use management server 30 and the connection management server 40 can transmit or receive data through a communication network. The use management server 30 can access the database 50 through a communication network and read or write a record of a connection history. The connection source device 10 can transmit/receive data to/from the use management server 30 and the connection management server 40 through a communication network. The connection destination device 20 can transmit/receive data to/from the use management server 30 and the connection management server 40 through a communication network. The configuration and the type of each of such communication networks are not particularly limited and may be designed with an arbitrary policy. For example, a communication network may be built using the Internet, an intranet, or a combination thereof. In addition, the communication network may be built using a wired communication network, a radio communication network, or a combination thereof. For example, the connection source device 10 may be connected to the use management server 30 and the connection management server 40 through a radio access network and a core network.

In FIG. 2, although only one connection source device 10 and one connection destination device 20 are illustrated, the number of connection source devices 10 and connection destination devices 20 of which connections are managed by the device management system 1 is not particularly limited. The device management system 1 can manage connections for a plurality of connection source devices 10 or a plurality of connection destination devices 20.

Each of the use management server 30 and the connection management server 40 is configured using at least one computer. In a case that a plurality of computers are used, by mutually connecting such computers through a communication network, logically-one use management server 30 or connection management server 40 is constructed.

The connection source device 10 includes a token management unit 11, an attribute acquisition unit 12, and a connection control unit 13 as functional elements. The token management unit 11 is a functional element that manages tokens. A token is information used for user authentication that is used for connecting the connection source device 10 and the connection destination device 20 and has a term of validity such as one time, one day, or one month. The attribute acquisition unit 12 is a functional element that acquires attributes of the connection source device 10. The connection control unit 13 is a functional element that displays a candidate list and establishes and disconnects a connection to the connection destination device 20.

The connection destination device 20 includes a detection unit 21, a connection control unit 22, and a data removal unit 23 as functional elements. The detection unit 21 is a functional element that detects a situation in which the connection source device 10 is in proximity to the connection destination device 20 and transmits a proximity notification that is a data signal representing this situation to the use management server 30. "The connection source device being in proximity to the connection destination device" represents a situation in which communication can be performed at least between the connection source device 10 and the connection destination device 20. In addition to the condition of being able to communicate with each other, when a condition of a distance between the connection source device 10 and the connection destination device 20 being smaller than a threshold is further satisfied, it may be determined that the connection source device 10 is in proximity to the connection destination device 20. The connection control unit 22 is a functional element that establishes and disconnects a connection with the connection source device 10. The data removal unit 23 is a functional element that deletes data relating to the connection source device 10, which is stored in a memory of the connection destination device 20, in response to disconnection between the connection source device 10 and the connection destination device 20.

The use management server 30 includes a notification processing unit 31, a list generating unit 32, and a history registering unit 33 as functional elements. The notification processing unit 31 is a functional element that acquires various notifications such as a proximity notification. The list generating unit 32 is a functional element that transmits a candidate list to the connection source device 10 in response to a proximity notification. More specifically, the list generating unit 32 refers to the database 50 that stores a connection history representing connections between the connection source device 10 and past connection destination devices. Then, the list generating unit 32 selects a candidate connection destination device 20 based on the connection history and generates and transmits a candidate list representing the candidate connection destination device 20. The history registering unit 33 is a functional element that registers records of the connection history in the database 50.

The connection management server 40 includes a token issuing unit 41, a notification processing unit 42, and a removal instruction unit 43 as functional elements. The token issuing unit 41 is a functional element that issues a token for the connection source device 10. The notification processing unit 42 is a functional element that receives a notification from the connection destination device 20 or the use management server 30 and transmits a notification to these computers. The removal instruction unit 43 is a functional element that instructs the connection destination device 20 to remove data.

The database 50 is a device (storage unit) that stores a connection history. The database 50 may be disposed as one element of the device management system 1 or may be managed inside a computer system other than the device management system 1. A method of implementing the database 50 is not limited, and, for example, a relational database may be employed.

The connection history is data representing past connections between the connection source device 10 and one or more past connection destination devices. More specifically, the connection history is data in which connection source device information relating to connection source devices, past connection destination device information relating to past connection destination devices, and past connection information relating to connections between a connection source device and past connection destination devices are associated with each other. The connection history may include both data representing connections that was actually established and data representing connections that had a possibility of being established but was not actually established.

FIG. 3 is a diagram illustrating one example of the connection history stored in the database 50. The connection source device information includes a connection source device ID that is an identifier uniquely identifying a connection source device and attributes of the connection source device. In FIG. 3, the connection source device information represents a connection source device ID, a remaining battery capacity, an application program in operation, and data processed by that application program. However, the attributes of the connection source device are not limited thereto and may include a type (category), a model name, a manufacturer name, a locked state/unlocked state of the device, and the like.

The past connection destination device information includes a connection destination device ID that is an identifier uniquely identifying a past connection destination device and attributes of the connection destination device. In FIG. 3, the past connection destination device information represents a connection destination device ID, a manufacturer name, a type (category), a use form, and a usage charge (an amount billed to a user) of the device. The use form may be a data item representing a way in which the connection destination device is provided and, for example, represents a public device, or a device for a specific person or only for a group. However, the attributes of the connection destination device are not limited thereto and may include a model name, a remaining battery capacity, an available use time, and the like.

The past connection information includes a use ID uniquely identifying a connection (a connection that was actually established or a connection that was not actually established) and attributes of the connection. In FIG. 3, the past connection information represents a use ID, a time period and a place in which the connection was established, a type of facility present at the place, and whether or not a connection was made. The connection time period, for example, may be represented using at least one of a date and time or a time frame in which the connection was started, a date and time or a time frame in which the connection was ended, and a connection continuation time. The connection place, for example, may be represented using at least one of a geographical location, a type of place, a name of a facility, and a floor name (level). The attributes of the connection are not limited thereto, and other data items may be set.

The data items of each record of the connection history are not limited to those of the example described above and may be arbitrarily designed. In addition, a data structure of the connection history on the database 50 is not limited and may be arbitrarily designed. For example, the connection history may be arbitrarily normalized or denormalized and be stored on one or a plurality of data tables.

Figure 5:
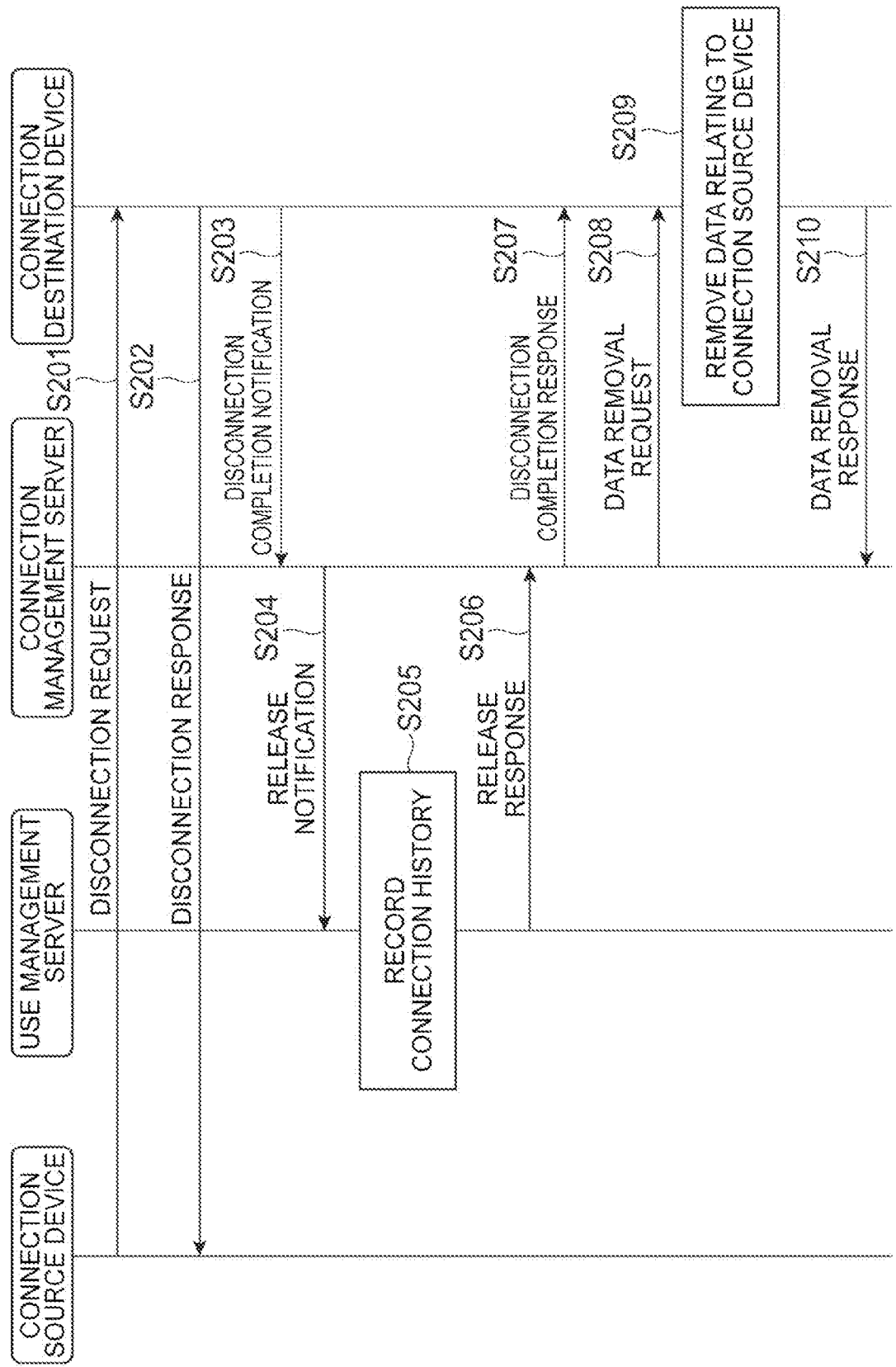
FIG. 5 is a sequence diagram illustrating one example of an operation of a device management system according to an embodiment.

An example of an operation of the device management system 1 according to this embodiment will be described with reference to FIGS. 4 and 5. Each of FIGS. 4 and 5 is a sequence diagram illustrating one example of the operation of the device management system 1. FIG. 4 illustrates one example of a process of displaying a candidate list on the connection source device 10 and a process of connecting the connection source device 10 and the connection destination device 20 thereafter. FIG. 5 illustrates one example of a process of disconnecting a connection between the connection source device 10 and the connection destination device 20.

In the processes illustrated in FIGS. 4 and 5, it is assumed that the connection source device 10 has already taken a valid token. The process of the connection source device 10 obtaining a token is as below. The token management unit 11 of the connection source device 10 transmits a token request to the connection management server 40. The token request is a data signal for requesting the connection management server 40 to issue a token and includes at least a connection source device ID. In the connection management server 40, the token issuing unit 41 generates (issues) a token in response to the token request and transmits a data signal including this token to the connection source device 10 as a token response. In the connection source device 10, the token management unit 11 receives the token response and stores the issued token in a memory of the connection source device 10. As described above, this token is valid only within a limited period. A series of these processes relating to the issuance of a token, for example, may be executed at a timing at which the user 90 of the connection source device 10 installs an application program for using the connection destination device 20 into the connection source device 10. Alternatively, the processes may be automatically executed at a timing at which the term of validity of the token expires or is likely to expire, and this may be referred to as an update of the token. However, the timing of token issuance is not limited thereto.

First, one example relating to display of a candidate list and a connection between devices will be described as a processing flow S1 with reference to FIG. 4.

In Step S101, the notification processing unit 31 of the use management server 30 receives a proximity notification from at least one connection destination device 20 corresponding to a geographical range to which the connection source device 10 is in proximity.

The connection source device 10 transmits a beacon including a connection source device ID at a predetermined time interval. By receiving the beacon, the detection unit 21 of the connection destination device 20 may detect a situation in which the connection source device is in proximity to the connection destination device 20. Alternatively, the detection unit 21 may estimate a distance between the connection destination device 20 and the connection source device 10 in response to the reception of the beacon and detect a situation in which the connection source device 10 is in proximity to the connection destination device 20 in response to the distance becoming less than a predetermined threshold. When the situation in which the connection source device 10 is in proximity to the connection destination device 20 is detected, the detection unit 21 transmits a proximity notification to the use management server 30. Generally, since the amount of information that can be included in a beacon is limited, there is a possibility that the connection destination device 20 cannot obtain all the required connection source device information from the beacon. In one example, the detection unit 21 may obtain an ID and a name of a connection source device as minimal information that can be used for identifying the connection source device 10. The detection unit 21 transmits a proximity notification including a part of the connection source device information (for example, an ID and a name of the connection source device) and connection destination device information (an ID and attributes of the connection destination device 20) that is information relating to the connection destination device 20 to the use management server 30. The name of the connection source device 10 may be omitted from the proximity notification.

A beacon transmitted from the connection source device 10 may be received by two or more connection destination devices 20 corresponding to the geographical range. In such a case, each of the two or more connection destination devices 20 transmits a proximity notification relating to the connection source device 10, and the notification processing unit 31 receives these proximity notifications.

In Step S102, the list generating unit 32 of the use management server 30 transmits an attribute inquiry to the connection source device 10 in response to the proximity notification. The attribute inquiry is a data signal (inquiry signal) used for obtaining current information of the connection source device 10 from the connection source device 10. This current information represents information indicating current attributes (for example, current features, current performance, a current configuration, a current function, or a current state) of the connection source device 10. In Step S103, the attribute acquisition unit 12 of the connection source device 10 obtains the current attributes of the connection source device 10 in response to the attribute inquiry. Then, the attribute acquisition unit 12 transmits an attribute response that is a data signal (response signal) including current information representing the attributes to the use management server 30.

In Step S104, the list generating unit 32 of the use management server 30 generates a candidate list. The list generating unit 32 identifies a geographical range to which the connection source device 10 is in proximity based on the proximity notification and identifies one or more connection destination devices 20 corresponding to the geographical range. Subsequently, the list generating unit 32 selects at least one of the one or more identified connection destination devices 20 as candidate connection destination devices 20, based on the connection history. Then, the list generating unit 32 generates a candidate list representing the candidate connection destination devices 20.

In order to identify a geographical range, the list generating unit 32 may refer to map data that represents respective geographical ranges. A method of identifying a geographical range is not particularly limited. If connection destination device information of the proximity notification represents a current location of the connection destination device 20, the list generating unit 32 may identify a geographical range based on the current location and the map data. If it is possible to refer to device location data representing correspondences between respective geographical ranges and current locations of the respective connection destination devices 20, the list generating unit 32 may identify a geographical range based on the device location data and the connection destination device information. Alternatively, the list generating unit 32 may identify a geographical range based on location information (the current location of the connection source device 10 or the connection destination device 20) obtained by a GPS function of the connection source device 10 or the connection destination device 20 and map data. A storage device for each of the map data and the device location data is not particularly limited. For example, the map data or the device location data may be stored in advance in a memory of the use management server 30, the database 50, another database inside the device management system 1, or a computer system other than the device management system 1.

In addition, a method of identifying a connection destination device 20 corresponding to a geographical range is not particularly limited. For example, the list generating unit 32 may identify one or more connection destination devices 20 corresponding to the identified geographical range by referring to the device location data. Alternatively, the list generating unit 32 may identify one or more connection destination devices 20 that have transmitted proximity notifications as connection destination devices 20 corresponding to the geographical range.

After identifying one or more connection destination devices 20 corresponding to the geographical range, the list generating unit 32 reads a connection history corresponding to a connection source device ID indicated in the proximity notification from the database 50, and selects candidate connection destination devices 20 based on the connection history. For example, the list generating unit 32 may execute the selection process based on at least one of the connection destination device information of each connection destination device 20 corresponding to the geographical range, the connection history (at least one of the connection source device information, the past connection destination device information, and the past connection information), and the current information of the connection source device 10 indicated in the attribute response. A specific selection method is not particularly limited, and various techniques may be employed.

For example, the list generating unit 32 may calculate a connection probability between the connection source device 10 and each of the connection destination devices 20 corresponding to the geographical range based on at least one of the connection destination device information of the connection destination device 20 corresponding to the geographical range, the connection history, and the current information of the connection source device 10. The list generating unit 32 selects connection destination devices 20 of which connection probabilities are equal to or higher than a predetermined threshold as candidates and excludes connection destination devices 20 of which connection probabilities are lower than the threshold. Then, the list generating unit 32 generates a candidate list in which the selected connection destination devices 20 are aligned in a descending order of the connection probabilities. The connection probability is an index that represents a magnitude of the likelihood of the user 90 using the connection destination device 20 through a connection between the connection source device 10 and the connection destination device 20. In the present disclosure, it is assumed that, as the connection probability becomes higher, a likelihood of the user connecting the connection source device 10 to the connection destination device 20 becomes higher. A method of calculating the connection probability is not particularly limited, and an arbitrary technique may be employed. For example, the list generating unit 32 may calculate a connection probability using a computation model having at least a part of a group formed by a data item of the connection destination device information of a connection destination device 20 corresponding to the geographical range, a data item of the connection history, and a data item of the current information of the connection source device 10 as its explanatory variables and having a connection probability as its objective variable. Examples of the computation model include a multiple regression analysis and machine learning. However, the technique for acquiring a connection probability is not limited thereto, and the list generating unit 32 may calculate a connection probability using an arbitrary computation model. In addition, a specific value of the threshold used for generating a candidate list is not particularly limited and may be arbitrarily designed.

Alternatively, the list generating unit 32 may select candidate connection destination devices 20 using a technique not using a connection probability. For example, the list generating unit 32 may select only connection destination devices 20 not included in a predetermined black list representing connection source devices with which a connection is not permitted. The list generating unit 32 may execute a similar process using a white list instead of the black list. Alternatively, the list generating unit 32 may select candidate connection destination devices 20 based on at least one data item of the current information of the connection source device 10. For example, the list generating unit 32 may select only connection destination devices 20 of a specific type or may select only connection destination devices 20 of which usage charges are equal to or lower than a threshold. The black list, the white list, the conditions, and the threshold described above may be set based on the connection history in advance.

The list generating unit 32 generates a candidate list indicating candidate connection destination devices 20. The candidate list may include connection destination device information (an ID and attributes) of each of the candidate connection destination devices 20. By including not only names of the connection destination devices 20 but also various attributes in the candidate list, detailed information of the connection destination devices 20 can be presented to the user 90 through the connection source device 10. The candidate list may include a new use ID that is used for a connection. The use management server 30 may transmit the new use ID to the connection source device 10 separately from the candidate list.

In Step S105, the list generating unit 32 transmits the candidate list to the connection source device 10. In this step, the new use ID is also transmitted to the connection source device 10.

In Step S106, the connection control unit 13 of the connection source device 10 displays the candidate list on a monitor. The user 90 can check connection destination devices 20 that are present nearby by viewing the candidate list and can select a connection destination device 20 desired to be used from the candidate list. Respective connection destination devices 20 indicated in the candidate list are strongly expected to be used by the user 90, and thus the user 90 can easily select a desired connection destination device 20 from the candidate list. In a case that the candidate list includes attributes of the respective connection destination devices 20, the user can select a specific connection destination device 20 after operating the candidate list to check the detailed information of the respective connection destination devices 20.

In Step S107, the connection control unit 13 of the connection source device 10 transmits a connection request to the connection destination device 20 in response to the user 90 selecting one connection destination device 20 from the candidate list. The connection request is a data signal requesting the connection destination device 20 to connect to the connection source device 10. The connection control unit 13 transmits a connection request including a use ID, a token, an ID and a name of the connection source device 10, and an ID and a name of the connection destination device 20 to the connection destination device 20. Relating to transmission of a connection request, the connection control unit 13 may display information relating to a connection with the connection destination device 20 on a monitor of the connection source device 10. For example, the connection control unit 13 may display that a connection process is in progress.

In Step S108, the connection control unit 22 of the connection destination device 20 transmits a token inquiry to the connection management server 40 in response to the connection request. The token inquiry is a data signal used for inquiring about whether or not a token that has been received from the connection source device 10 is valid.

In Step S109, the notification processing unit 42 of the connection management server 40 determines whether or not a token represented in the token inquiry is valid and transmits a token response that is a data signal representing a result of the determination to the connection destination device 20. In this embodiment, a token response is assumed to represent that a token is valid.

In Step S110, the connection control unit 22 of the connection destination device 20 transmits a connection response to the connection source device 10 based on the token response. The connection response is a data signal representing that a connection with the connection source device 10 is accepted. The connection source device 10 receives the connection response, whereby the connection source device 10 connects to the connection destination device 20 through a radio communication network.

In Step S111, the connection control unit 22 of the connection destination device 20 transmits a connection completion notification to the connection management server 40. The connection completion notification is a data signal representing that the connection source device 10 has connected to the connection destination device 20 through a radio communication network. The connection control unit 22 includes a use ID, an ID and a name of the connection source device 10, and an ID and a name of the connection destination device 20.

In Step S112, the notification processing unit 42 of the connection management server 40 transmits a use start notification to the use management server 30 in response to the connection completion notification. The use start notification is a data signal representing that the connection source device 10 has connected to the connection destination device 20 and has become able to use the connection destination device 20. The use start notification includes a use ID, an ID and a name of the connection source device 10, and an ID and a name of the connection destination device 20.

In Step S113, the history registering unit 33 of the use management server 30 generates a record of the connection history based on the use start notification and stores this record in the database 50. This record is recording that represents a connection that has actually been established. For example, the history registering unit 33 can generate a record based on information included in a proximity notification received from the connection destination device 20 selected by the user 90 and information included in a use start notification.

In Step S114, the notification processing unit 31 of the use management server 30 transmits a use start response that is a data signal representing that the use start notification has been normally processed to the connection management server 40.

In Step S115, the notification processing unit 42 of the connection management server 40 transmits a connection completion response that is a data signal representing that the connection completion notification has been normally processed to the connection destination device 20.

As represented in the processing flow S1, the list generating unit 32 of the use management server 30 refers to the database 50, selects at least one of one or more connection destination devices 20 corresponding to a geographical range as candidate connection destination devices 20 based on a connection history, and transmits a candidate list representing at least one candidate connection destination device 20 to the connection source device 10 to display the candidate list on the connection source device 10. This candidate list represents only connection destination devices 20 to which the user 90 is highly expected to connect the connection source device 10, and thus, the user 90 can easily select a connection destination device 20 desired to be used. Therefore, the convenience of a network connection between devices for the user 90 is improved.

Next, one example of a process of disconnecting a connection between the connection source device 10 and the connection destination device 20 will be described as a processing flow S2 with reference to FIG. 5.

In Step S201, the connection control unit 13 of the connection source device 10 transmits a disconnection request to the connection destination device 20. The disconnection request is a data signal used for disconnecting a connection between the connection source device 10 and the connection destination device 20.

In Step S202, the connection control unit 22 of the connection destination device 20 transmits a data signal corresponding to the disconnection request to the connection source device 10 as a disconnection response. The connection source device 10 receives the disconnection response, whereby the connection between the connection source device 10 and the connection destination device 20 is disconnected.

In Step S203, the connection control unit 22 of the connection destination device 20 transmits a disconnection completion notification to the connection management server 40. The disconnection completion notification is a data signal representing that the connection between the connection source device 10 and the connection destination device 20 has been disconnected. The connection completion notification includes a use ID, an ID and a name of the connection source device 10, and an ID and a name of the connection destination device 20.

In Step S204, the notification processing unit 42 of the connection management server 40 transmits a release notification to the use management server 30 in response to the disconnection completion notification. The release notification is a data signal representing that the connection between the connection source device 10 and the connection destination device 20 has been disconnected. The release notification includes a use ID, an ID and a name of the connection source device 10, and an ID and a name of the connection destination device 20.

In Step S205, the history registering unit 33 of the use management server 30 updates a record of the connection history corresponding to the use ID based on the release notification, if necessary, thereby recording the connection history of this connection.

In Step S206, the notification processing unit 31 of the use management server 30 transmits a release response that is a data signal representing that the release notification has been normally processed to the connection management server 40.

In Step S207, the notification processing unit 42 of the connection management server 40 transmits a disconnection completion response that is a data signal representing that the disconnection completion notification has been normally processed to the connection destination device 20.

Thereafter, a process of removing data of the connection source device 10 that is stored inside the connection destination device 20 is executed. In Step S208, the removal instruction unit 43 of the connection management server 40 transmits a data removal request to the connection destination device 20. The data removal request is a data signal used for removing data relating to the connection source device 10 that is stored inside the connection destination device 20.

In Step S209, the data removal unit 23 of the connection destination device 20 removes data relating to the connection source device 10 in response to the data request. For example, the data removal unit 23 removes data that can be used for identifying the user 90 or the connection source device 10 or removes data received from the connection source device 10. By this process, data of the connection source device 10 is removed from a memory of the connection destination device 20, and the connection destination device 20 returns to a state before the connection with the connection source device 10 (in other words, a state before the execution of the processing flow S1). Therefore, the possibility of another user accessing the data of the connection source device 10 (the user 90) through the connection destination device 20 can be excluded.

In Step S210, the data removal unit 23 of the connection destination device 20 transmits a data removal response that is a data signal representing that the data removal request has been normally processed to the connection management server 40.

The processing sequence of the device management system 1 is not limited to the processing flows S1 and S2. For example, when a proximity notification from the connection destination device 20 includes connection source device information that is sufficient for generating a candidate list, the transmission/reception of an attribute inquiry and an attribute response (Steps S102 and S103) may be omitted. As another example, in Step S101, a proximity notification may be transmitted not from the connection destination device 20 but from the connection source device 10 to the use management server 30. As another example, recording of a connection history in case that a connection is established may be executed only in one of Steps S113 and S205.

The user 90 may select a plurality of connection destination devices 20 from the candidate list, and the connection source device 10 may be connected to the plurality of connection destination devices 20 in response thereto. In such a case, for a connection between the connection source device 10 and each of the plurality of connection destination devices 20, the processes of Steps S107 to S115 and the processing flow S2 are executed.

In this embodiment, although the use management server 30 and the connection management server 40 are separate from each other, these two servers may be integrated as one unit.

Each block diagram used for description of the embodiment described above illustrates blocks in units of functions. Such functional blocks (component units) are realized by an arbitrary combination of at least one of hardware and software. In addition, a method for realizing each functional block is not particularly limited. In other words, each functional block may be realized by one device that is combined physically or logically or a plurality of devices by directly or indirectly (for example, using a wire, wirelessly, or the like) connecting two or more devices separated physically or logically. A functional block may be realized by combining software with one device or the plurality of devices described above.

Figure 6:
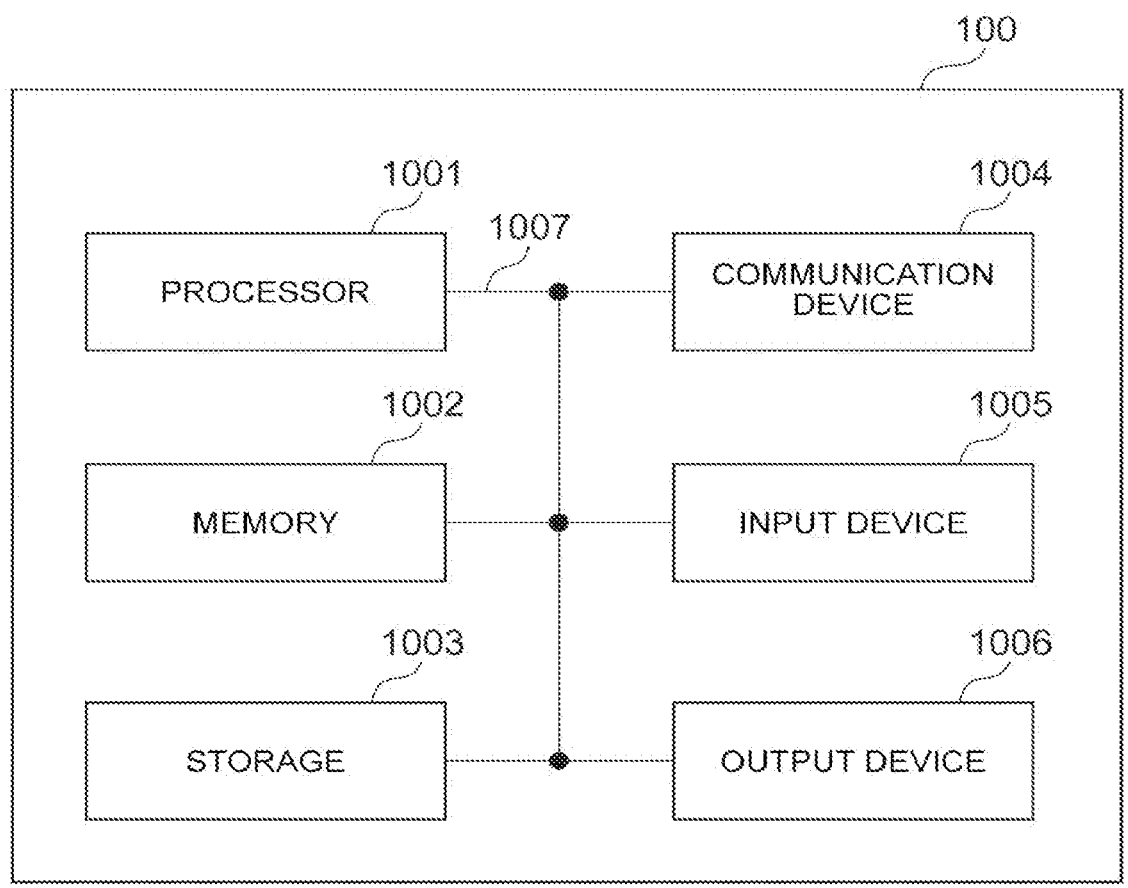
FIG. 6 is a diagram illustrating one example of the hardware configuration of a computer used in a device management system according to an embodiment.

For example, the server or the device according to one embodiment of the present disclosure may function as a computer that performs the process of the present disclosure. FIG. 6 is a diagram illustrating one example of the hardware configuration of the computer 100 that functions as the server or the device. The computer 100, physically, may include a processor 1001, a memory 1002, a storage 1003, a communication device 1004, an input device 1005, an output device 1006, a bus 1007, and the like.

In addition, in the following description, a term "device" may be rephrased as a circuit, a device, a unit, or the like. The hardware configuration of the server or the device may be configured to include one or a plurality of devices illustrated in the drawing and may be configured without including some of these devices.

Each function of the server or the device may be realized when the processor 1001 performs an arithmetic operation by causing predetermined software (a program) to be read onto hardware such as the processor 1001, the memory 1002, and the like, controls communication using the communication device 1004, and controls at least one of data reading and data writing for the memory 1002 and the storage 1003.

The processor 1001, for example, controls the entire computer by operating an operating system. The processor 1001 may be configured by a central processing unit (CPU) including an interface with peripheral devices, a control device, an arithmetic operation device, a register, and the like.

In addition, the processor 1001 reads a program (program code), a software module, data, and the like from at least one of the storage 1003 and the communication device 1004 into the memory 1002 and executes various processes in accordance with these. As the program, a program causing a computer to execute at least some of the operations described in the embodiment described above is used. For example, each functional element of the server or the device may be realized by a control program that is stored in the memory 1002 and operated by the processor 1001. Although the various processes described above have been described as being executed by one processor 1001, the processes may be executed simultaneously or sequentially by two or more processors 1001. The processor 1001 may be realized using one or more chips. In addition, the program may be transmitted from a network through a telecommunication line.

The memory 1002 is a computer-readable recording medium and, for example, may be configured by at least one of a read only memory (ROM), an erasable programmable ROM (EPROM), an electrically erasable programmable ROM (EEPROM), a random access memory (RAM), and the like. The memory 1002 may be referred to as a register, a cache, a main memory (a main storage device), or the like. The memory 1002 can store a program (a program code), a software module, and the like executable for performing the method according to one embodiment of the present disclosure.

The storage 1003 is a computer-readable recording medium and, for example, may be configured by at least one of an optical disc such as a compact disc ROM (CD-ROM), a hard disk drive, a flexible disk, a magneto-optical disk (for example, a compact disc, a digital versatile disc, or a Blue-ray (registered trademark) disc), a smart card, a flash memory (for example, a card, a stick, or a key drive), a floppy (registered trademark) disk, a magnetic strip, and the like. The storage 1003 may be referred to as an auxiliary storage device. The storage medium described above, for example, may be a database including at least one of the memory 1002 and a storage 1003, a server, or any other appropriate medium.

The communication device 1004 is hardware (a transmission/reception device) for performing inter-computer communication through at least one of a wired network and a wireless network and, for example, may be called also a network device, a network controller, a network card, a communication module, or the like.

The input device 1005 is an input device (for example, a keyboard, a mouse, a microphone, a switch, buttons, a sensor, or the like) that accepts an input from the outside. The output device 1006 is an output device (for example, a display, a speaker, an LED lamp, or the like) that performs output to the outside. In addition, the input device 1005 and the output device 1006 may have an integrated configuration (for example, a touch panel).

In addition, devices such as the processor 1001, the memory 1002, and the like are connected using a bus 1007 for communication of information. The bus 1007 may be configured as a single bus or buses different between devices.

In addition, the computer 100 may be configured to include hardware such as a microprocessor, a digital signal processor (DSP), an application specific integrated circuit (ASIC), a programmable logic device (PLD), a field programmable gate array (FPGA), or the like, and a part or the whole of each functional block may be realized by the hardware. For example, the processor 1001 may be mounted using at least one of such hardware components.

As described above, a device management system according to one aspect of the present disclosure includes: an acquisition unit configured to obtain a proximity notification that represents a situation in which a portable connection source device is in proximity to one geographical range; and a list generating unit configured to transmit a candidate list representing candidate connection destination devices to be connected with the connection source device through a radio communication network to the connection source device in response to the proximity notification. The list generating unit is further configured to: refer to a database storing a connection history that represents past connections between the connection source device and one or more past connection destination devices; select at least one of one or more devices corresponding to the geographical range as the candidate connection destination devices based on the connection history; and display the candidate list on the connection source device by transmitting the candidate list representing at least one candidate connection destination device to the connection source device.

In such an aspect, connection destination devices that become candidates to be connected with the connection source device through a network are selected based on past records representing that the connection source device was connected to other devices (past connection destination devices). By referring to the past connection recordings of the connection source device, connection destination devices having high probabilities of being selected by the user can be included in the candidate list, and thus, it is expected to improve the convenience of network connections between devices. In addition, a process and communication for displaying connection destination devices having low likelihood of a connection with the connection source device become unnecessary, and a user can save efforts for re-searching connection destination devices. Accordingly, the amounts of consumption of hardware resources (the amount of usage of a processor, the amount of consumption of a memory, and the like) in the device management system and the connection source device can be reduced.

In a device management system according to another aspect, the list generating unit may calculate a connection probability between the connection source device and each of the one or more devices corresponding to the geographical range based on the connection history and select the device of which connection probability is equal to or higher than a threshold as the candidate connection destination device and exclude the device of which connection probability is lower than the threshold. By generating the candidate list based on the connection probability, only connection destination devices with high probability of being used by a user can be included in the candidate list.

In a device management system according to another aspect, the connection history may be data in which connection source device information relating to the connection source device, past connection destination device information relating to the past connection destination devices, and past connection information relating to the connections between the connection source device and the past connection destination devices are associated with each other. The list generating unit may calculate the connection probability based on at least one of device information relating to each of the one or more devices corresponding to the geographical range, the connection source device information, the past connection destination device information, and the past connection information. By acquiring the connection probability based on information of devices corresponding to the geographical range, the connection source device, past connection destination devices, or past connections, only connection destination devices with high probabilities of being used by a user can be included in the candidate list.

In a device management system according to another aspect, the proximity notification may include a connection source device ID uniquely identifying the connection source device. The list generating unit may transmit an inquiry signal for inquiring about current information of the connection source device to the connection source device in response to the proximity notification, receive a response signal, which is transmitted from the connection source device in response to the inquiry signal, representing the current information of the connection source device, and select the candidate connection destination device based on device information relating to each of the one or more devices corresponding to the geographical range, the current information of the connection source device, and the connection history. Before a connection between the connection source device and a connection destination device is established, there is a possibility of being unable to acquire sufficient information relating to the connection source device due to restrictions of beacon and the like. As the device management system obtains current information from the connection source device in response to a proximity response, sufficient information relating to the connection source device can be acquired at an appropriate timing and through an appropriate communication path.

As above, while the present disclosure has been described in detail, it is apparent to a person skilled in the art that the present disclosure is not limited to the embodiments described in the present disclosure. The present disclosure may be modified or changed without departing from the concept and the scope of the present disclosure set in accordance with the claims. Thus, the description presented in the present disclosure is for the purpose of exemplary description and does not have any limited meaning for the present disclosure.

Each aspect/embodiment described in the present disclosure may be applied to long term evolution (LTE), LTE-advanced (LTE-A), Super 3G, IMT-advanced, 4G ($4^{th}$ generation mobile communication system), 5G ($5^{th}$ generation mobile communication system), future ratio access (FRA), new radio (NR), W-CDMA (registered trademark), GSM (registered trademark), CDMA 2000, ultra mobile broadband (UMB), IEEE 802.11 (Wi-Fi (registered trademark)), IEEE 802.16 (WiMAX (registered trademark)), IEEE 802.20, ultra-wideband (UWB), Bluetooth (registered trademark), a system using another appropriate system and at least one of next generation systems extended based on these. In addition, the aspect/embodiment may be applied to a combination of plurality of systems (for example, a combination of at least one of LTE and LTE-A and 5G or the like).

The processing sequence, the sequence, the flowchart, and the like of each aspect/embodiment described in the present disclosure may be changed in order as long as there is no contradiction. For example, in a method described in the present disclosure, elements of various steps are presented in an exemplary order, and the method is not limited to the presented specific order.

The input/output information and the like may be stored in a specific place (for example, a memory) or managed using a management table. The input/output information and the like may be overwritten, updated, or added to. The output information and the like may be deleted. The input information and the like may be transmitted to another device.

A determination may be performed using a value ("0" or "1") represented by one bit, may be performed using a Boolean value (true or false), or may be performed using a comparison between numerical values (for example, a comparison with a predetermined value).

The aspects/embodiments described in the present disclosure may be individually used, used in combination, or be switched therebetween in accordance with execution. In addition, a notification of predetermined information (for example, a notification of being X) is not limited to being performed explicitly and may be performed implicitly (for example, a notification of the predetermined information is not performed).

It is apparent that software, regardless of whether it is called software, firmware, middleware, a microcode, a hardware description language, or any other name, may be widely interpreted to mean a command, a command set, a code, a code segment, a program code, a program, a subprogram, a software module, an application, a software application, a software package, a routine, a subroutine, an object, an executable file, an execution thread, an order, a function, and the like.

In addition, software, a command, information, and the like may be transmitted and received via a transmission medium. For example, when software is transmitted from a website, a server, or any other remote source using at least one of a wiring technology such as a coaxial cable, an optical fiber cable, a twisted pair, a digital subscriber line (DSL) or the like and a radio technology such as infrared rays, microwaves, or the like, at least one of such a wiring technology and a radio technology is included in the definition of the transmission medium.

Information, a signal, and the like described in the present disclosure may be represented using any one among other various technologies. For example, data, a direction, a command, information, a signal, a bit, a symbol, a chip, and the like which can be described over the entire description presented above may be represented using a voltage, a current, radiowaves, a magnetic field or magnetic particles, an optical field or photons, or an arbitrary combination thereof.

In addition, a term described in the present disclosure and a term that is necessary for understanding the present disclosure may be substituted with terms having the same meaning or a meaning similar thereto. For example, a signal may be a message.

Terms such as "system" and "network" used in the present disclosure are interchangeably used.

In addition, information, a parameter, and the like described in the present disclosure may be represented using absolute values, relative values with respect to predetermined values, or other corresponding information. For example, a radio resource may be instructed using an index.

The names used for the parameters described above are not used as limited names in any respect. In addition, a numerical expression and the like using such parameters may be different from those explicitly disclosed in the present disclosure.

Terms such as "connected" or "coupled" or all the modifications thereof mean all kinds of direct or indirect connection or coupling between two or more elements and the presence of one or more intermediate elements between two elements that are mutually "connected" or "coupled" can be included. Coupling or connection between elements may be physical coupling or connection, logical coupling or connection, or a combination thereof. For example, "connection" may be rephrased as "access." When used in the present disclosure, two elements may be considered as being mutually "connected" or "coupled" by using at least one of one or more electric wires, cables, and print electric connections and, as several non-limiting and non-comprehensive examples, by using electromagnetic energy having wavelengths in a radio frequency region, a microwave region, and a light (both visible light and non-visible light) region.

Description of "based on" used in the present disclosure does not mean "only based on" unless otherwise mentioned. In other words, description of "based on" means both "only based on" and "at least based on."

In a case in which "include," "including," and modifications thereof are used in the present disclosure, such terms are intended to be inclusive like a term "comprising." In addition, a term "or" used in the present disclosure is intended to be not an exclusive logical sum.

In the present disclosure, for example, when an article such as "a," "an," or "the" in English is added through a translation, the present disclosure may include a plural form of a noun following such an article.

REFERENCE SIGNS LIST

1 Device management system
10 Connection source device
11 Token management unit
12 Attribute acquisition unit
13 Connection control unit
20 Connection destination device
21 Detection unit
22 Connection control unit
23 Data removal unit
30 Use management server
31 Notification processing unit
32 List generating unit
33 History registering unit
40 Connection management server
41 Token issuing unit
42 Notification processing unit
43 Removal instruction unit
50 Database
60 Candidate list
80 Geographical range
81 Signage (connection destination device)
82 Speaker (connection destination device)
83 HMD (connection destination device)

The invention claimed is:

1. A device management system comprising:
at least one memory operable to store program code; and
at least one processor operable to read the program code and operate as instructed by the program code, the program code being configured to cause the at least one processor to:
obtain a proximity notification that represents a situation in which a portable connection source device is in proximity to one geographical range; and
transmit a candidate list representing candidate connection destination devices to be connected with the connection source device through a radio communication network to the connection source device in response to the proximity notification,
wherein the program code is further configured to cause the at least one processor to:
refer to a database storing a connection history that represents past connections between the connection source device and one or more past connection destination devices;
select at least one of one or more devices corresponding to the geographical range as the candidate connection destination devices based on the connection history; and
display the candidate list on the connection source device by transmitting the candidate list representing at least one candidate connection destination device to the connection source device,
wherein the program code is further configured to cause the at least one processor to:
calculate a connection probability between the connection source device and each of the one or more devices corresponding to the geographical range based on the connection history; and
select the device of which the connection probability is equal to or higher than a threshold as the candidate connection destination device and exclude the device of which the connection probability is lower than the threshold.

2. The device management system according to claim 1, wherein the connection history is data in which connection source device information relating to the connection source device, past connection destination device information relating to the past connection destination devices, and past connection information relating to the connections between the connection source device and the past connection destination devices are associated with each other, and
wherein the program code is further configured to cause the at least one processor to calculate the connection probability based on at least one of device information relating to each of the one or more devices corresponding to the geographical range, the connection source device information, the past connection destination device information, and the past connection information.

3. The device management system according to claim 1, wherein the proximity notification includes a connection source device ID uniquely identifying the connection source device,
wherein the program code is further configured to cause the at least one processor to:
  transmit an inquiry signal for inquiring about current information of the connection source device to the connection source device in response to the proximity notification;
  receive a response signal, which is transmitted from the connection source device in response to the inquiry signal, representing the current information of the connection source device; and
  select the candidate connection destination device based on device information relating to each of the one or more devices corresponding to the geographical range, the current information of the connection source device, and the connection history.

* * * * *